P. H. Niles,
Soldering Machine.
N° 54,195.  Patented Apr. 24, 1866.
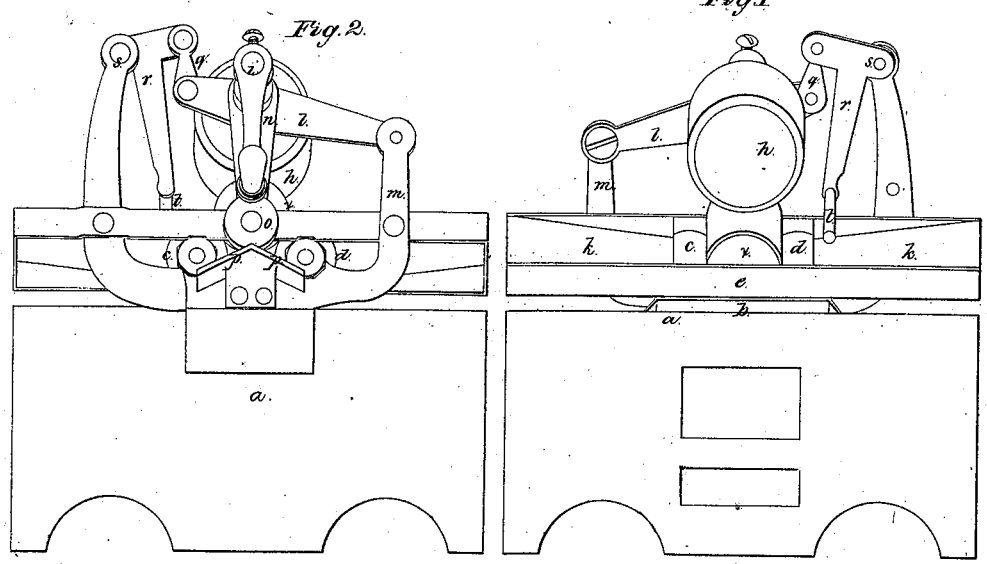
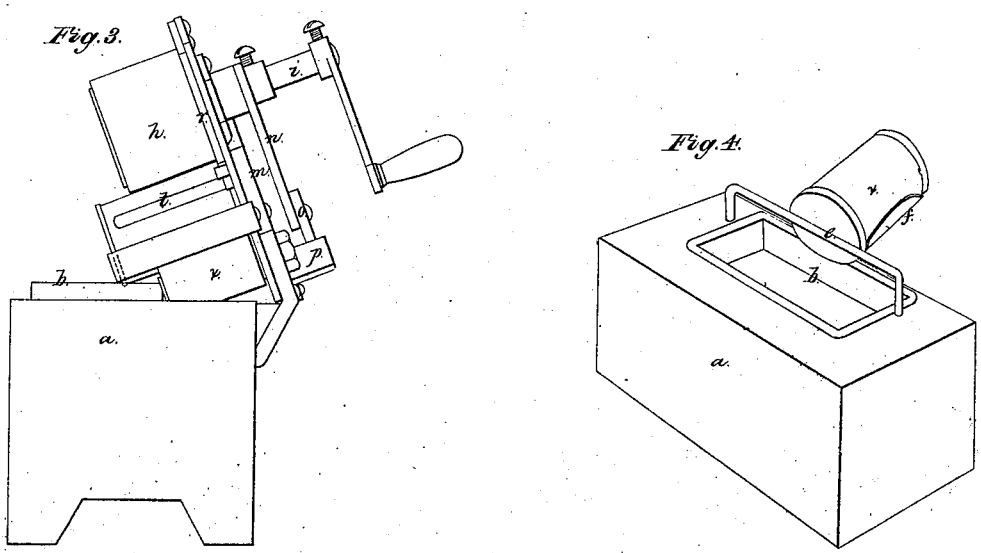
Witnesses.  Inventor.

UNITED STATES PATENT OFFICE.

PETER H. NILES, OF BOSTON, MASSACHUSETTS.

IMPROVED MACHINE FOR SOLDERING TIN CANS.

Specification forming part of Letters Patent No. 54,195, dated April 24, 1866.

*To all whom it may concern:*

Be it known that I, PETER H. NILES, of Boston, in the county of Suffolk and State of Massachusetts, have invented an Improvement in Soldering Cylindrical Vessels of Sheet Metal; and I do hereby declare that the following, taken in connection with the drawings which accompany and form part of this specification, is a description of my invention sufficient to enable those skilled in the art to practice it.

In the manufacture of cylindrical tin cans, or vessels of sheet metal, it is very desirable to dispense with the employment of the common copper bit or hand soldering-tool, by which the well-known process of uniting the fixed end to the can is effected, and to substitute for such manipulation some process which can be more expeditiously performed, which shall not require the skill of a mechanician, and which will be attended with more uniformly perfect results.

It is such substitution that forms the object of this invention, which consists, primarily, in the employment of an inclined seat or bed-piece and a stop-rail, which have such relation to a pan of melted solder that the joint to be soldered (when the can is placed upon the seat with the end resting against the stop-rail) dips into the solder, so that by rotation of the can the entire circular joint is brought into contact with the solder, and the parts thereby united, the only skill required being that necessary to rotate the can.

The invention also consists in the employment of a series of contact-rolls, between which the can is placed in such a manner that by rotation of one of the rolls the can is rotated, as above set forth, and also in a mechanism by which a number of cans placed in a guideway are successively and automatically brought into position to be soldered, and are successively and automatically discharged after the soldering is effected.

The drawings represent an apparatus embodying the invention, Figure 1 showing a front elevation, Fig. 2 a rear elevation, and Fig. 3 an end elevation, of the same.

$a$ denotes a furnace, made in any suitable manner, for melting and keeping in a melted condition the solder contained in a pan, $b$, in the top of the furnace. Above the table is an inclined seat, which seat, in the apparatus shown, consists of two friction-rolls, $c\ d$. Upon this seat is placed the cylindrical vessel $x$ to be soldered, with its end resting against a stop or rail, $e$, placed directly over the pan $b$, the position of the seat and guide with reference to each other and to the pan $b$ being such that the bottom of the joint at the end of the can extends down into the melted solder in the pan, so that rotation of the can by hand or otherwise causes the whole length of the joint to travel through the solder, and the parts to be thereby united, a suitable flux being, of course, applied around the joint before the can is rotated.

The simplest form of the apparatus as thus far explained is seen in the modification at Fig. 4, where the inclined seat $f$, with the furnace-pan and stop-rail, constitute the whole of the apparatus, the can $x$ being here rotated by hand, and the seat being made semi-tubular to keep the can in position while being turned. It is desirable, however, to employ mechanism to effect this rotation, and for this purpose I use the inclined rolls $c\ d$ for the support of the can, and a roll, $h$, to rest against and rotate it, this roll $h$ being placed on a crank-shaft, $i$, and the can being placed between the rolls $c\ d$ and the roll $h$, as seen in the drawings.

The roll $h$ may be surfaced with leather, rubber, or other similar material.

To introduce and discharge the cans automatically I employ a mechanism as follows: On each side of the rolls $c\ d$ is a guideway or chute, $k$, and the cans to be soldered are placed upon the entering side, the lower ends resting against an extension of the guide-rail $e$, the first can being placed between the rolls and the others resting, respectively, in contact.

The crank-shaft $i$ rotates in a bearing in an arm, $l$, which is jointed to a standard, $m$. An arm, $n$, fastened to the crank-shaft, carries a roll, $o$, which rests in contact with a double incline, $p$. The outer end of the arm $l$ is jointed by a link, $q$, to a lever, $r$, hung on a fulcrum at $s$, this lever having a projecting arm or rod, $t$, through which the cans are fed between the rolls.

The operation is as follows: Rotation being imparted to the crank-shaft, the contact of the surface of the roll $h$ with the surface of the can rotates the can on the rolls $c\ d$ and causes the joint to be soldered, as before explained. The circumference of the roll $h$ is somewhat greater than that of the can, and as the roller on the arm $n$ in its rotation strikes one of the inclines $p$ it slides up upon the same, and thereby raises the crank-shaft and the roll $h$. This releases the soldered can from the contact of the roll $h$, and the upward movement of the arm $n$ actuates the lever $r$ and causes the rod $t$ to drive the can next to the one just soldered down the chute, pushing the soldered can out into the outlet-chute. As the roll on the arm $n$ runs down the opposite incline the roll $h$ comes down upon the newly-entered can, which is, in turn, rotated by the action of the roll $h$, and is then expelled by the next can in the same manner.

It will be obvious that this arrangement and method of operation of the soldering mechanism enables the work to be very quickly and perfectly accomplished with no other skill than that of an ordinary attendant.

I claim—

1. The method of soldering a cylindrical vessel of sheet metal by supporting it in an inclined position with reference to a pan of melted solder in such manner that rotation of the vessel will cause the joint to be soldered to travel through the solder by means substantially as described.

2. The employment of the friction-rolls $c$ $d$ and the driving-roll $h$, for effecting the rotation of the can or vessel, arranged and operating substantially as described, for the purpose set forth.

3. The employment of mechanism for automatically introducing the cans to the action of the rolls and removing them therefrom, arranged and operating substantially as set forth.

In witness whereof I have hereunto set my hand this 11th day of December, A. D. 1865.

P. H. NILES.

Witnesses:
FRANCIS GOULD,
J. B. CROSBY.